United States Patent [19]

Stoy et al.

[11] Patent Number: 5,307,833
[45] Date of Patent: May 3, 1994

[54] METHOD AND APPARATUS FOR AUTOMATICALLY TRANSFERRING AND MEASURING WET STEAM BETWEEN PRIORITY AND SECONDARY USERS

[75] Inventors: James R. Stoy, Missouri City; James L. G. Schrodt, Houston, both of Tex.; Stephen S. Wheeler, Bakersfield, Calif.

[73] Assignee: Texaco Inc., White Plains, N.Y.

[21] Appl. No.: 966,633

[22] Filed: Oct. 26, 1992

[51] Int. Cl.$^5$ .............................. G05D 7/01
[52] U.S. Cl. ...................... 137/118; 73/199; 137/552
[58] Field of Search ............ 73/195, 199; 137/14, 137/118, 552

[56] References Cited

U.S. PATENT DOCUMENTS 3,556,126  1/1971  Oswald .................. 137/118
4,836,032  6/1989  Redus et al. .......... 73/861.04

*Primary Examiner*—Gerald A. Michalsky
*Attorney, Agent, or Firm*—James L. Bailey; Kenneth R. Priem; Russell J. Egan

[57] ABSTRACT

A system by which a supplier of wet steam may allocate and measure the mass flow rate and quality of steam delivered to a demand user and one or more secondary users with the wet steam delivered to each user being measured for purposes of billing. Pressure regulator means between the demand customer and the secondary customers responsive to pressure changes caused by the amount of steam going to the demand customer. The demand customer thus being able to take from 0 to 100% of the steam generator output with the remaining steam being allocated to the secondary customers.

5 Claims, 1 Drawing Sheet

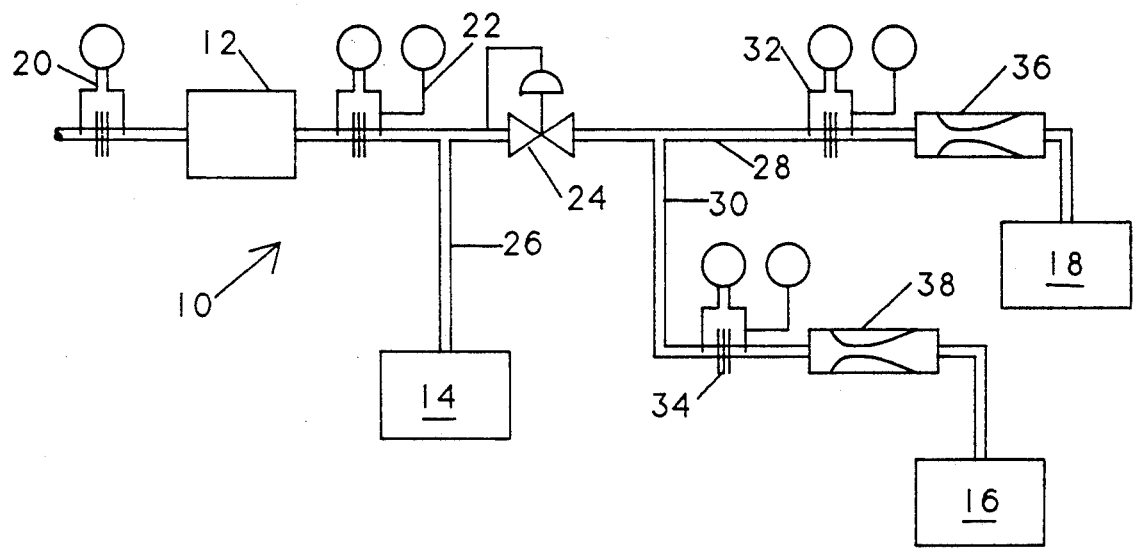

METHOD AND APPARATUS FOR AUTOMATICALLY TRANSFERRING AND MEASURING WET STEAM BETWEEN PRIORITY AND SECONDARY USERS

BACKGROUND OF THE INVENTION

1. The Field of the Invention

The present invention pertains to a system allowing wet steam to be allocated among priority and secondary users and, in particular, to a system which will measure the mass rate and quality of steam delivered to each user to facilitate proper billing for steam usage.

2. The Prior Art

There are many instances when wet steam supplied from a single generating source is divided among multiple users of the steam for whatever their purpose. Thus it is important to be able to divide steam between multiple users and to allocate the steam to each user according to a scheme which is defined by the arrangement of a custody transfer system within an overall steam distribution piping system.

It can be appreciated that wet steam will normally leave the steam generator or source at a known quality, pressure and mass flow rate. It is important, therefore, as a matter of economic practicality that a means be instituted to control distribution and quality of the steam. It is desirable that this be automatic to allocate steam between a multiplicity of users according to predetermined allocation schemes, such as distribution to a single priority user and one or more secondary users. The purpose of such a custody transfer system would be to monitor each user's consumption of steam such that each user will be charged only for the amount of steam actually consumed.

The measurement or monitoring of steam quality is important to determine steam usage for proper billing. Steam quality is a direct measurement of the heat contained in the steam and therefore represents the amount of fuel used to generate the steam and thus its cost.

In brief, it is desirable that the quality of steam, that is the mass of the steam vapor divided by the total mass, and that the mass flow rate be known and that the amount of steam consumed by each user likewise be known.

SUMMARY OF THE INVENTION

The present invention concerns a method by which a supplier of wet steam (less than 100% quality) may allocate and measure the mass rate and quality (vapor mass fraction) of steam delivered to priority and secondary steam users. The method involves the combined use of at least one steam flow measurement system; at least one pressure regulating valve; and means to collect record, and process data from the individual measuring systems. This invention has the capability of allocating steam according to a preset scheme according to the type and number of users.

BRIEF DESCRIPTION OF THE DRAWINGS

The present invention will now be described, by way of example, with reference to the accompanying drawing in which:

The single FIGURE is a schematic diagram of a priority demand customer and multiple secondary customer configuration of the present invention.

DETAILED DESCRIPTION OF THE PRESENT INVENTION

The subject system is specifically designed to handle wet steam and operates automatically in allocating steam to the various steam customers and to measure each allocation. This system is configured such that the priority customer always receives as much steam as is necessary to meet his needs, by reducing steam normally delivered to other customers as required to meet the priority customer's needs.

U.S. Pat. No. 4,836,032, the disclosure of which is incorporated herein by reference, describes a system to simultaneously measure mass flow rate and steam quality of two phase steam by utilizing a critical flow device, such as a venturi, in conjunction with a common orifice type flowmeter. The steam mass rate passing through the venturi is described by the equation:

$$M = \frac{K_v P c^2}{X^a}$$

Where:
M = Steam Mass Rate
$K_v$ = Empirically Derived Flow Coefficient
P = Steam Pressure Upstream of Venturi
c = Venturi Throat Diameter
X = Steam Quality
a = Empirically Derived Exponent It should be noted that in order for the above equation to hold true the venturi must be operating in critical flow. Critical flow, for purposes of this discussion, is defined as the flow rate necessary to achieve a pressure drop across the venturi equal to or less than the critical pressure ratio. The critical pressure ratio is the maximum ratio of downstream to upstream pressure at which mass rate is independent of downstream pressure. U.S. Pat. No. 5,141,055 describes a venturi design which enables the critical pressure ratio to be as high as 0.85. The disclosure of this patent is incorporated herein by reference. Several devices are capable of operating in critical flow and thus can be substituted for the venturi described above. The venturi is used solely by example and the present invention is not limited thereto.

The steam mass rate flowing through the orifice meter is described by the equation:

$$M = \frac{K_o d^2}{\sqrt{1-B^4}} * \sqrt{\frac{dP}{X^b V_{fg} - V_f}}$$

Where:
M = Steam Mass Rate
$K_o$ = Empirically Derived Flow Coefficient
d = Orifice Diameter
B = Orifice Meter Beta Ratio (d/D)
D = Orifice Meter Run Inside Diameter
X = Steam Quality
b = Empirically Derived Exponent
dP = Orifice Meter Differential Pressure
$V_{fg}$ = Steam Specific Volume of Evaporation
$V_f$ = Steam Specific Volume of the Liquid Phase The two above equations are both solvable for steam mass rate in terms of steam quality. Since, in general, neither mass rate nor quality is known, the two equations may be solved simultaneously for mass rate and quality. One method which has been successfully demonstrated is the Newton-Raphson iterative solution.

Note that the venturi equation implies that the mass rate through the venturi is directly proportional to the pressure upstream of the venturi. It is this aspect of the venturi's behavior that is exploited by this invention.

The system 10, shown in the single FIGURE, has a source of steam 12 supplying demand customer 14 and secondary customers 16, 18. Feed water (from a source not shown) is fed through an orifice meter 20 to the steam source. A two phase orifice meter 22 monitors the steam quality from steam source 12 using known feed water mass rate from the feed water orifice meter 20. Pipeline 26 conducts steam to the demand customer 14. Pressure regulator 24 is configured to maintain constant discharge pressure, from the steam source to the demand customer 14. The demand customer 14 is allowed to take as much steam as is necessary to meet its needs, up to the point where all of the generated steam is supplied to the demand customer. The amount of steam supplied to the demand customer 14 determines how much steam is left to be delivered to secondary customers 16, 18. Each of the secondary customer pipelines 28, 30 is equipped with a two phase orifice meter 32, 34 and critical venturi 36, 38.

This invention, as depicted in the single FIGURE, places a pressure regulating valve upstream of an orifice venturi steam flow measurement system as described in the above mentioned U. S. Pat. Nos. 4,836,032 and 5,141,055. The subject system is designed to maintain a constant pressure on a constant-flow rate wet steam source with the wet steam supplied to the demand customer as required. The secondary customers receive any and all steam remaining after the demand customer's needs are met. Secondary customers receive the remaining steam in pre-determined proportions as dictated by the throat diameters of the venturis installed in each respective orifice-venturi metering system. The steam mass rate from the steam source is known from measurements of feed water mass rate. The steam quality from the source 12 is measured by any meter 22 which determines steam quality based on a known mass rate, such as a simple orifice meter using the second equation above. The mass rate and quality of the steam delivered to the secondary customers are known from the measurements taken by the orifice-venturi metering systems 32, 36 and 34, 38. Therefore the mass rate and quality of the steam delivered to the demand customer can be calculated, applying fundamental thermodynamics, from the difference between the steam supplied from the source minus the steam supplied to the secondary customers.

The dynamic behavior of the system is governed by the fact that the mass rate through the venturi is pressure dependant. If the demand customer 14 increases steam usage, the pressure at the discharge from the source 12 will momentarily be reduced. This causes the pressure regulator 24 to close partially restricting steam pressure available at the secondary customer's venturis 36, 38. Reduced venturi pressure translates directly to reduced steam flow through the venturi. The reduction in steam flow at the secondary customers' venturis is exactly equal to the increase in steam flow to the demand customer.

The present invention may be subject to many modifications and changes, which will be apparent to one skilled in the art, without departing from the spirit or essential characteristics thereof. For example, the present invention has been shown and described with only two secondary customers solely for the sake of simplicity of illustration. Any number of secondary customers, up to the limit of the steam generator, may be added to the system. The present embodiment is therefore to be considered in all respects as illustrative and not restrictive of the scope of the invention as defined by the appended claims.

We claim:

1. A system for automatically controlling the quantity of wet steam delivered to a plurality of customers from a single steam source, said system comprising:

steam generating means having an inlet connected to a feed water source and an outlet:

means connected to said steam generating outlet to measure the steam quality from said steam generating means;

a demand customer connected to said outlet of said steam generating means;

a plurality of secondary customers connected in parallel;

pressure regulator means connected between said demand customer and said secondary customers and configured to maintain constant discharge pressure to the demand customer; and steam flow measurement means to simultaneously measure mass flow rate and steam quality of two phase steam and connected between said pressure regulator and each secondary customer to determine the quality and quantity of wet steam delivered to each respective secondary customer.

2. A system according to claim 1 wherein said means to measure the steam quality from said steam generator further comprises means to measure the mass flow rate of feed water from said source to said steam generating means.

3. A system according to claim 1 wherein said means to simultaneously measure mass flow rate and steam quality of two phase steam comprises:

a critical flow device; and a subcritical flow meter.

4. A system according to claim 3 wherein said critical flow device is a venturi.

5. A system according to claim 3 wherein said subcritical flow meter is an orifice.

* * * * *